US010040951B2

(12) United States Patent
Risseeuw et al.

(10) Patent No.: US 10,040,951 B2
(45) Date of Patent: Aug. 7, 2018

(54) PROTECTIVE COATING FOR METAL SURFACES

(71) Applicant: TECHNIP FRANCE, Courbevoie (FR)

(72) Inventors: Izaak Jacobus Risseeuw, Courbevoie (FR); Franciscus Arnoldus Maria Jeunink, Courbevoie (FR)

(73) Assignee: TECHNIP FRANCE (FR)

( * ) Notice: Subject to any disclaimer, the term of this patent is extended or adjusted under 35 U.S.C. 154(b) by 43 days.

(21) Appl. No.: 14/437,104

(22) PCT Filed: Oct. 25, 2013

(86) PCT No.: PCT/EP2013/072407
§ 371 (c)(1),
(2) Date: Apr. 20, 2015

(87) PCT Pub. No.: WO2014/064256
PCT Pub. Date: May 1, 2014

(65) Prior Publication Data
US 2015/0284571 A1 Oct. 8, 2015

(30) Foreign Application Priority Data
Oct. 26, 2012 (EP) .................................... 12190188

(51) Int. Cl.
C09D 5/08 (2006.01)
B01J 19/02 (2006.01)
(Continued)

(52) U.S. Cl.
CPC ................ C09D 5/08 (2013.01); B01J 19/02 (2013.01); B01J 19/2415 (2013.01); C10G 2/31 (2013.01);
(Continued)

(58) Field of Classification Search
None
See application file for complete search history.

(56) References Cited

U.S. PATENT DOCUMENTS 6,921,431 B2     7/2005 Evans et al.
2001/0010808 A1* 8/2001 Yagi .................... B01J 23/40
                                                    423/418.2

(Continued)

FOREIGN PATENT DOCUMENTS

CN   102333824 A   1/2012
EP   0 739 969 A2  10/1996
(Continued)

OTHER PUBLICATIONS

International Search Report dated Dec. 4, 2013 issued in corresponding International patent application No. PCT/EP2013/072407.
(Continued)

Primary Examiner — Colin W. Slifka
(74) Attorney, Agent, or Firm — Ostrolenk Faber LLP

(57) ABSTRACT

A method for heating or cooling a carbon containing reducing gas having a carbon monoxide content of at least 0.5 vol %, wherein the gas is heated to a temperature of at least 400° C. or wherein the gas is cooled from a temperature exceeding 400° C., wherein the gas is passed along a surface of a heating or cooling unit having a heat conductive metal or metal alloy body and a protective layer, which protective layer provides said surface, and which protective layer is made from a coating composition including colloidal amorphous silicate and crystalline oxide particles.

28 Claims, 3 Drawing Sheets

(51) Int. Cl.
*B01J 19/24* (2006.01)
*C10K 1/04* (2006.01)
*C10G 9/00* (2006.01)
*C10G 2/00* (2006.01)
*C10J 3/74* (2006.01)
*C23C 24/10* (2006.01)

(52) U.S. Cl.
CPC .............. *C10G 2/32* (2013.01); *C10G 9/002* (2013.01); *C10J 3/74* (2013.01); *C10K 1/04* (2013.01); *C23C 24/10* (2013.01); *B01J 2219/00094* (2013.01); *B01J 2219/0209* (2013.01); *B01J 2219/0218* (2013.01); *B01J 2219/0286* (2013.01)

(56) References Cited

U.S. PATENT DOCUMENTS

2006/0156958 A1* 7/2006 Simmons ................ C04B 28/00
106/600
2008/0020216 A1 1/2008 Bagnoli et al.
2008/0124255 A1* 5/2008 Johnston ................ B01J 19/249
422/600
2009/0252660 A1 10/2009 Olver et al.
2011/0305605 A1 12/2011 Jaeger ........................ 422/241

FOREIGN PATENT DOCUMENTS

| WO | WO 99/49988 A1 | 10/1999 |
| WO | WO 02/18128 A1 | 3/2002 |
| WO | WO 2005/005680 A2 | 1/2005 |
| WO | WO 2010/097300 A1 | 9/2010 |

OTHER PUBLICATIONS

Written Opinion dated Dec. 4 2013 issued in corresponding International patent application No. PCT/EP2013/072407.
Chinese Office Action, dated Apr. 18, 2016, issued in corresponding Chinese Patent Application No. 201380068112.4. Total 10 pages.

* cited by examiner

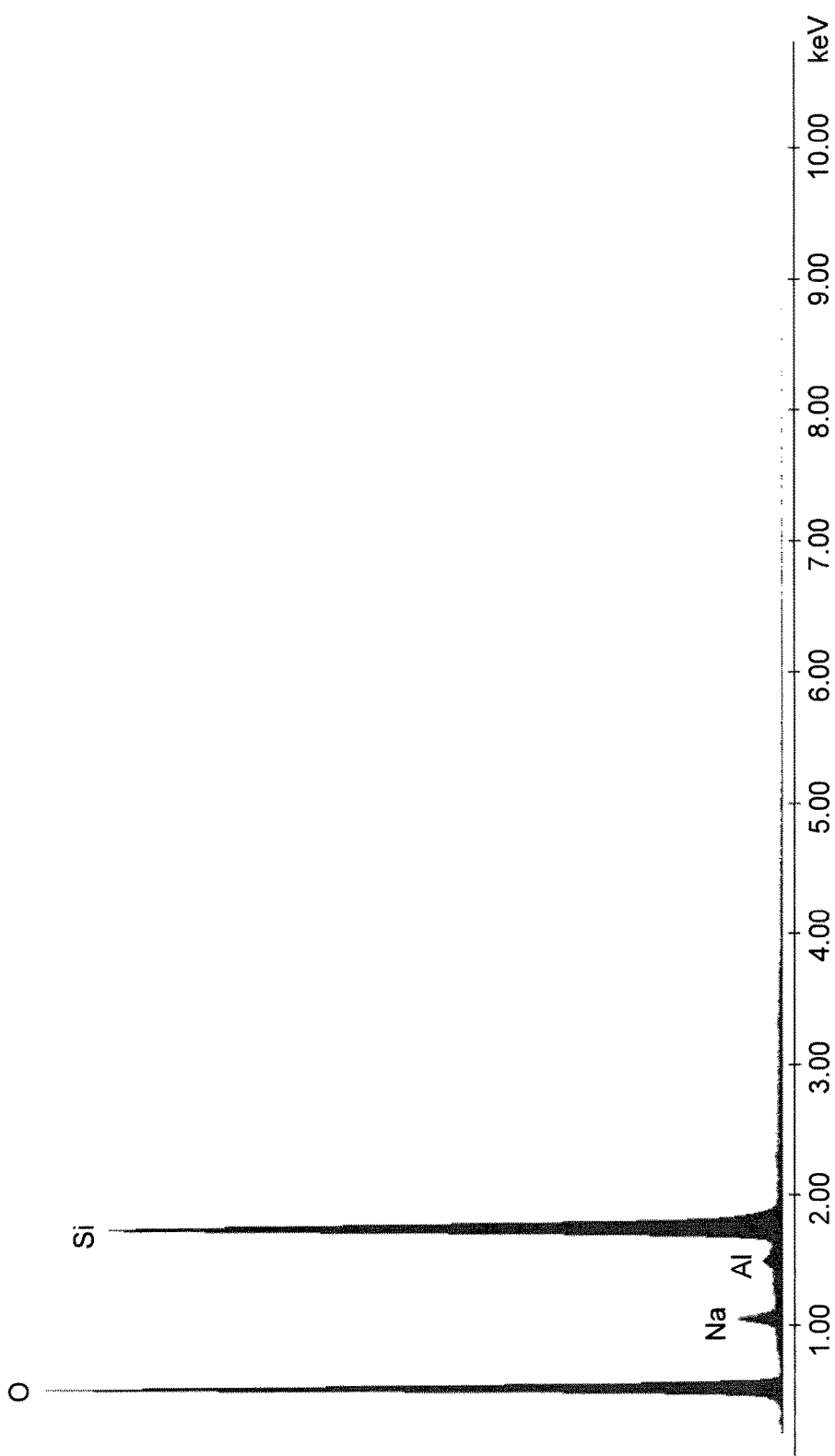

PROTECTIVE COATING FOR METAL SURFACES

CROSS REFERENCE TO RELATED APPLICATIONS

The present application is a 35 U.S.C. § 371 National Phase conversion of PCT/EP2013/072407, filed Oct. 25, 2013, which claims benefit of European Application No. 12190188.8, filed Oct. 26, 2012, the disclosure of which is incorporated herein by reference. The PCT International Application was published in the English language.

TECHNICAL FIELD OF THE INVENTION

The invention is directed to a method for heating or cooling a reducing gas.

BACKGROUND OF THE INVENTION

High temperature corrosion is a chemical process wherein high temperature (typically temperatures above 350° C.) causes a material to react with its surroundings, typically with gaseous compounds in the atmosphere, thereby damaging the material. A distinction can be made between uniform surface corrosion, wherein the damage from corrosion is essentially evenly spread over the entire surface of the material, and pitting corrosion, wherein corrosion is more localized and leads to small holes in the material.

High temperature corrosion may be the result of oxidation with molecular oxygen (e.g. scale formation). However, it may also occur in an atmosphere with low oxygen content, for example in a carbon containing atmosphere, for instance an atmosphere that contains carbon monoxide.

High temperature corrosion may for example occur if a metallic object is brought into contact with a gas containing carbon monoxide, methane and/or other carbon-containing components at high temperatures, in particular when said gas has a low oxygen content. Examples of such high temperature corrosion are carburization and metal dusting.

Carburization is a corrosion process wherein a metallic material (typically iron or an alloy thereof, such as steel) is damaged due to exposure to a carbon containing atmosphere at high temperatures. In this process, carbon is diffused into the surface of the metallic material and subsequently metal carbides are formed. Carburization may result in the material becoming brittle and may cause crack formation. Furthermore, carburization can result in loss of mechanical properties, such as loss of oxidation resistance. It is also known to intentionally carburize materials to impart a high surface hardness and wear resistance. For example, steels can be treated to enrich the carbon content of the surface layer.

Metal dusting is a corrosion process which typically follows the process of carburization of a carbon source, such as carbon monoxide, typically at a temperature in the range of about 350 to about 1050° C.

In this process, metallic materials are disintegrated into a dust of graphite and metal particles in strongly carburizing atmospheres. Metal dusting may result in metal loss and/or severe pitting of the material. Without wishing to be bound by any theory, it is expected that the mechanism of carburization is as follows. First, there is uptake of carbon into the metallic phase leading to supersaturation of carbon in the alloy, which subsequently forms a metastable metal carbide ($M_3C$, wherein M is the metal, e.g. Cr, Fe, Ni), which then migrates away from the metal surface into the graphite layer.

Material degradation caused by high temperature corrosion such as carburization and metal dusting is for example considered a problem in petrochemical technical processes, for example in heating tubes and other metal components in industrial furnaces for case hardening of steels.

Metal dusting is especially considered a problem in a reducing atmosphere, such as atmospheres containing relatively high amounts of carbon monoxide. For example, metal tubes wherein a reducing gas is processed at high temperatures may suffer from strong corrosion. Under such conditions, metal dusting causes catastrophic corrosion of the metal surfaces that are in contact with the reducing gas. Catastrophic corrosion refers to corrosion that takes place in a very short amount of time, e.g. less than 10 days.

Although mild corrosion may also be observed in cracking tubes, catastrophic corrosion by metal dusting does typically not occur to a large extent in cracking processes. The hydrocarbon gas heated in a cracking tube is not strongly reducing and does not have a carbon monoxide content higher than 0.5 vol. %. Furthermore, a the metal surfaces of a cracking furnace are typically covered by a carbon deposit, as a result of coke formation. Such a coking layer prevents the hydrocarbon gas from directly accessing the metal surface of the cracking tube, thereby limiting the corroding effect the hydrocarbon gas may have on the metal surface.

In the art, several techniques are known to prevent carburization and/or metal dusting.

WO 2010/097300 describes a surface treatment of metals to protect against metal dusting. A porous coating is used made from nanoparticles and a ceramic powder.

US 2008/0020216 describes the use of a coated metal composition comprising an oxide layer and a coating metal layer to prevent metal dusting on metallic surfaces.

An object of the invention is to provide a method for protecting metallic surfaces from high temperature corrosion in a reducing atmosphere, in particular in a carburizing atmosphere.

A further object of the invention is to provide a method for heating or cooling a reducing gas in a metal containing tube wherein the reducing gas is subjected to a high temperature at which carburisation and/or metal dusting is typically a problem in the absence of adequate protection, wherein said metal containing tube is protected against carburization and/or metal dusting.

SUMMARY OF THE INVENTION

In accordance with the invention, it has been found that a layer made of a coating composition comprising amorphous silicate, crystalline oxide, optionally an emissivity agent and optionally a stabiliser/binding agent successfully prevents or at least substantially reduces high temperature corrosion of the metallic layer under carburizing conditions and/or metal dusting conditions. The term carburizing conditions as used herein refers to conditions under which the metallic layer would carburize and subsequently metal dusting may occur. More in particular, carburizing conditions refer to a reducing atmosphere at high temperature (at least 400° C.) in the presence of relative high amounts of carbon containing compounds. These specific conditions are described in more detail below.

Accordingly, the present invention relates to a method for heating or cooling a carbon containing reducing gas, wherein the gas is heated to a temperature of at least 400° C. or wherein the gas is cooled from a temperature exceeding 400° C., wherein the gas is passed along a surface of a heating or cooling unit comprising a heat conductive metal or metal alloy body and a protective layer, which protective layer provides said surface, and which protective layer is made from a coating composition comprising
  amorphous silicate;
  crystalline oxide;
  optionally an emissivity agent; and
  optionally a stabiliser/binding agent.

The inventors surprisingly found that the protective layer reduces or even prevents the catastrophic corrosion of metal surfaces that occurs when such surfaces are in contact with a reducing gas containing 0.5 vol % carbon monoxide at high temperatures. The protective layer is formed by solidifying and/or drying a liquid coating comprising amorphous silicate and crystalline oxide. The inventors found that the specific form of the silicate and oxide in the coating (crystalline vs. amorphous; colloidal nature of the silicate), as well as the ratio of silicate and oxide used may have an influence on the anti-metal dusting properties of the eventual protective layer.

The term "or" as used herein is defined as "and/or" unless specified otherwise.

The term "a" or "an" as used herein is defined as "at least one" unless specified otherwise.

When referring to a noun (e.g. a compound, an additive, etc.) in the singular, the plural is meant to be included.

When referring to a metal, this is generally meant to include metal alloys.

Typically, the protective layer is essentially non-porous, i.e. at least essentially free of macropores (pores having a diameter >50 nm, flow through described by bulk diffusion). Preferably, the essentially non-porous protective layer is also essentially free of mesopores (2-50 nm diameter, flow through described by Knudsen diffusion), and more preferably also of micropores (<2 nm diameter, movement by activated diffusion). Accordingly, the BET specific surface may be considerably less than in a porous coating, e.g. as described in WO 2010/097300, in particular less than 20 $m^2/g$ or less than 15 $m^2/g$.

The protective layer protects the metal surface against corrosion from the gas phase. It is contemplated that coating components such as silicon, will partly dissolve (diffuse) into the surface layer of the metal. As a result a protective layer is maintained in the case that the top coating layer would be damaged. The composition of the protective layer and of the coating composition from which the layer is made are discussed in detail below.

The protective layer in the present invention does not require catalytic action. Typical catalysts (such as silver, platinum, palladium, rhodium etc.) are sensitive to fouling, catalyst poisons and aging of a catalyst. An advantage of this invention is that it is not sensitive to catalyst poisons and aging of catalyst.

The present invention does not require use of sulphur compounds. Sulphur compounds are considered catalyst poison. There is no risk that any sulphur compounds are released from the coating. The coating in the present invention has the advantage that there is no risk of poisoning catalyst that may be placed downstream the coating. There is no risk that the products that are processed are contaminated with sulphur compounds.

The invention further relates to a method of applying a protective coating to a metal or metal alloy surface of a heating or cooling unit comprising a heat conductive metal or metal alloy body. The method comprises applying a coating composition comprising
  amorphous silicate;
  crystalline oxide particles
  optionally further comprising an emissivity agent
  optionally further comprising an additional stabiliser/binding agent to the metal or metal alloy surface.

The coating composition that is applied is preferably a suspension comprising the amorphous silicate and crystalline oxide particles. The suspension usually is an aqueous suspension.

The metal is preferably at about ambient temperature—typically 5 to 40° C.—when the composition is applied. The surface to which the composition is applied is preferably clean and dry before application of the protective coating of the present invention. If the surface of the metal is not dry and clean, this may cause cracking or peeling of the coating.

The coating composition can be applied to the metal surface by painting. Suitable methods are e.g. spraying, dip-coating, spin-coating etc. Good results are obtained with air spraying with oil free air and a 1 mm nozzle and an air pressure between 1 and 2 bar.

For a uniform coverage and density of the product it is preferred to spray the coating composition at an angle of the spray gun which is rotated about 90 degrees during application. This is particular advantageous in order to prevent formation of stripes.

After applying the coating composition (comprising a liquid), the coating is typically dried. Preferably the composition is air-dried, although it is also possible to heat-dry the composition.

Further, the applied coating composition is usually subjected to a high temperature heat-treatment (solidification), at which fusion of the particles occurs. The temperature during this treatment is usually at least about 800° C., for instance 800-1200° C. The duration is usually at least about 10 min, for instance 15-120 min. Usually the temperature and duration are chosen such that an essentially non-porous protective layer is obtained, more preferably a non-porous glassy protective layer.

The protective layer can be obtained by coating a surface of the heating or cooling unit, such as the inner surface of a tube with a coating composition known from U.S. Pat. No. 6,921,431. Furthermore, it is known from US 2009/0252660 to use of the coating of U.S. Pat. No. 6,921,431 as a thermal protective layer in a cracking furnace. This layer is said to limit coking and generation of uniform heating. Coking is the undesirable formation of coke layers along the inner surface of the process tubes of a cracking furnace. Surprisingly, it has been found that this type of coating is also suitable as protective coating layer to prevent or at least reduce high temperature corrosion under metal dusting conditions.

The protective layer or coating composition may comprise 5-35 wt. % (colloidal) amorphous silicate (e.g. in the form of amorphous silicate nanoparticles), 23-79 wt. % crystalline oxide particles, 0-20 wt. % emissivity agent and 0-5 wt. % stabiliser/binding agent.

The amorphous silicate in the coating composition usually is a colloidal silicate. Preferably the amorphous silicate comprises a silicate selected from the group of sodium silicate, potassium silicate, calcium silicate and magnesium silicate. In particular good results with respect to obtaining a protective layer have been achieved with a composition comprising amorphous colloidal sodium silicate particles.

The amorphous silicate may further comprise colloidal silica. Accordingly, the amorphous silicate is or comprises a mixture of colloidal silica and the metal silicate described above. The weight ratio of colloidal silica to metal silicate in the amorphous silicate may be in the range of 1:100 to 100:1, typically in the range of 10:90 to 90:10, for example in the range of 25:75 to 75:25.

The silicate and/or silica particles are colloidal. This means that they are fine amorphous particles, which typically originate from a suspension wherein the particles are dispersed in a liquid phase (e.g. in water). Typically, at least 99% of the colloidal particles may have a range from about 1 to 120 nm. The colloidal nature of the particles is important with respect to the properties of the glassy protective layer that is formed upon drying and/or solidifying the coating composition. Since most water will typically be evaporated upon drying and/or solidifying, the particles in the protective layer can technically no longer be called colloidal.

The amorphous silicate may be present in the (liquid) coating composition or (glassy) protective layer in an amount of 5-35 wt. %, preferably 15-25 wt. %, based on the total dry weight of the coating or layer.

The crystalline oxide particles may in particular be selected from the group of lithium oxide, potassium oxide, sodium oxide and/or aluminium oxide, calcium oxide, titanium dioxide, magnesium oxide, zirconium dioxide, boric oxide and silica crystalline oxide particles. In particular, good results have been achieved with crystalline aluminium oxide particles.

The crystalline oxide particles may be present in the (liquid) coating composition or (glassy) protective layer in an amount of 23-79 wt. % (e.g. 35-70 wt. %), preferably 50-65 wt. %, based on the total dry weight of the coating or layer.

The specific combination of amorphous silicate and crystalline oxide in the ranges and form described above provides the glassy protective layer with very desirable properties with respect to preventing metal dusting. In particular good results have been obtained using a coating or layer comprising amorphous sodium silicate, colloidal silica and crystalline aluminium oxide.

Optionally an emissivity agent is present in the coating composition and/or protective layer. The presence of an emissivity agent has the advantage of higher heat transfer due to an increased heat radiation. Examples of suitable emissivity agents are silicon hexaboride, boron carbide, silicon tetraboride, silicon carbide, molybdenum disilicide, tungsten disilicide, zirconium diboride, cupric chromite and metallic oxides.

The stabiliser, which is optionally present in the protective layer, may be selected from bentonite, kaolin, magnesium alumina silica clay, tabular alumina and stabilized zirconium oxide, preferably bentonite.

As mentioned above, the protective layer does not require the presence of a catalyst that contributes to the protection against metal dusting, such as preferably used in WO 2010/097300. Thus, in a preferred embodiment, the protective layer is essentially free of such catalysts, in particular essentially free of catalytically active forms of transitional metals, rare-earth elements, noble metals. A protective layer is considered to be essentially free thereof, if the presence of such components does not significantly contribute to the protective effect against metal dusting, in particular if such components are non-detectible by a conventional detection technique.

Preferably, the protective layer formed upon drying and/or solidifying the coating is of a glassy material. Preferably the glassy protective layer contains $Na_2SiO_2$. The presence thereof is preferred in particular for improved strength of the layer. Such a glassy structure can be obtained by heating the coating composition, comprising a sodium source, e.g. sodium silicate to a temperature in excess of about 800 C.

Based on U.S. Pat. No. 6,921,431, the information disclosed herein and common general knowledge, the skilled person will understand how to prepare the coating composition and provide the protective layer of the tube or other heating unit. Water is typically present in the liquid coating composition in an amount of 20-60 wt. %, based on the total weight of the coating composition. In a preferred embodiment, the protective layer is made from a coating composition comprising a powder of at least one inorganic adhesive, a filler and water. Stabilizer is added to the wet mixture. One or more emissivity agents may be added to improve heat transfer by radiation to the gas.

The thickness of the protective layer usually is more than 10 μm. Preferably the thickness is at least 20 μm. Particularly good results have been achieved with a thickness of at least about 50 μm. In particular, the thickness of the protective layer may be 1 mm or less, more in particular 200 μm or less.

The heating or cooling unit, such as a (heating) tube, comprises a metal or a metal alloy, which metal or metal alloy is susceptible to carburization and/or metal dusting. Examples of such susceptible metals are iron and nickel. Examples of susceptible metal alloys are iron alloys (steel), nickel alloys and chromium alloys). In particular, the metal alloy may be steel. Steel is an iron alloy and comprises one or more other elements in addition to iron. The one or more other elements may for example be selected from the group consisting of nickel, cobalt, molybdenum, titanium, vanadium, manganese, chromium, silicon, boron and carbon. In a preferred embodiment, the body of the heating or cooling unit comprises iron, nickel and/or chromium. In particular preferred is a tube of which said outer layer is made of an steel alloy containing nickel, such as a (high) nickel chromium alloy. Good results have in particular been obtained when the steel is stainless steel, in particular with a stainless steel comprising iron, nickel, chromium and manganese.

In a method for heating a reducing gas according to the invention, the carbon containing reducing gas is generally heated to a temperature in the range of 350-1050° C., in particular to a temperature of at least 400° C. In particular, the gas is heated to a temperature of 1000° C. or less. The gas is preferably heated to a temperature of 400-900° C. The invention is in particular advantageous to protect against metal dusting at a temperature in the range of, 500-800° C., in which range metal dusting has been found a highly problematic in the absence of adequate protection.

In a method for cooling a reducing gas according to the invention, the carbon containing reducing gas is generally cooled to a temperature whereby at least during part of the cooling process, the temperature of the gas is at a value at which carburization of the carbon containing gas under metal dusting conditions could occur (in the absence of adequate protection, i.e. typically a temperature of about 350 to about 1050° C.

Thus. the gas may be cooled from a temperature above 1050° C. to a temperature below 1050° C. or from a temperature in the range of 350 to 1050° C. to a lower temperature in that range or to a temperature below that range, e.g. to a temperature of 250° C. or less.

Preferably, a method of cooling is used to cool the gas, wherein at least during part of the cooling process the gas has a temperature in the range of 350-1000° C., in particular a temperature of 400-900° C., more in particular a temperature in the range of 500-800° C., in which range metal dusting has been found a highly problematic in the absence of adequate protection.

The gas heated or cooled in a method of the invention is a reducing gas. Accordingly, the method of the invention is conducted under a reducing atmosphere. The reducing gas comprises one or more reducing agents, preferably carbon monoxide. Furthermore, the gas is typically at least substantially free of oxidizing agents, in particular of molecular oxygen.

The gas heated or cooled in a method according to the invention is a carbon containing gas. This means that the gas comprises one or more carbon containing compounds. As used herein, a carbon containing compound refers to a compound that comprises at least one carbon atom. Preferably, the carbon containing compound is a reducing agent. A preferred reducing carbon containing compounds is carbon monoxide. Further examples are alkanes, such as methane, ethane, propane, and carbon dioxide. The content of the carbon containing compounds in the gas is usually at least 0.05 vol %, in particular a least 0.5 vol % preferably at least 5 vol %. The content may be up to 100%, in particular 50% or less.

In particular in case of alkanes, the content preferably is preferably 5-20 vol %. It is particularly preferred that the carbon containing gas has a carbon monoxide content of at least 0.5 vol %. The carbon monoxide content may be considerably higher, such as 2-100 vol %, in particular 5-50 vol %, more in particular 10-40 vol %.

More in particular, the reducing gas has a content of carbon monoxide of at least 1 vol % volume percent, preferably at least 2 vol %, more preferably at least 5 vol %. The reducing gas may further comprise hydrogen gas, for example 20-80 vol. % $H_2$. The reducing gas may comprise hydrogen ($H_2$) and carbon monoxide (CO) as the major components. This means that no other compound is present in the reducing gas in a concentration that is either higher than the $H_2$ content or than the CO content.

In addition to methane, the reducing gas may further comprise $CO_2$, for example 1-15 vol. % $CO_2$. The CO containing reducing gas may also comprise methane, e.g. 1-40 vol. % $CH_4$ and/or water, e.g. 1-75 vol. % $H_2O$.

Specific examples of gas compositions wherein metal dusting has been reported are:

| $H_2$ | CO | $CO_2$ | $CH_4$ | $N_2$ | $H_2O$ |
|---|---|---|---|---|---|
| 75 | 12 | 3 | 6 | 2 | 2 |
| 53 | 9 | 3 | 24 | 9 | 2 |
| 76 | 14 | 2 | 5 | 1 | 2 |
| 34 | 6 | 4 | 3 | 2 | 51 |

In an advantageous embodiment of a method for heating or cooling a gas, the gas is synthesis gas, which gas generally comprises hydrogen and carbon monoxide as the major components.

The carbon containing reducing gas is typically passed through the tube in a turbulent flow.

In certain embodiments, the surface of the metal or metal alloy body of the heating or cooling unit is essentially free of sulphur compounds, in particular from hydrogen sulphide. Although these compounds are known to reduce metal dusting when applied to the metal surface by blocking the metal surface against carbon deposition, the presence of sulphide compounds on the metal surface is not always desirable. For example, sulphur is a well known catalyst poison.

Furthermore, the surface of the metal or metal alloy body of the heating or cooling unit is essentially free of (a physical layer of) carbon deposit, such as a cokes layer. During heating or cooling, the coating is also essentially free of such a deposit or layer.

Heating a carbon containing reducing gas is conducted in many industrial processes. The method for heating of the invention may in particular be used in petrochemical technical processes such as coal liquefaction and coal gasification, in synthesis gas reactors, such as steam reformers and in plants for processing of synthesis gas, such as ammonia production, in Fischer-Tropsch reactions, Direct Reduction Iron (DRI) plants or coal gasification coal liquefaction plants.

In a specific embodiment, the method for heating of the invention is used in industrial furnaces for hardening of steels. Herein, the inner surface of the heating chamber wherein the steel is heated is coated with a coating composition comprising
colloidal amorphous silicate
crystalline oxide particles
optionally further comprising an emissivity agent
optionally further comprising an additional stabiliser/binding agent.

In a preferred embodiment, the method for heating is used in a process for preparing a synthesis gas, wherein carburization and/or metal dusting by the synthesis gas is prevented. The preparation of the synthesis gas may be performed in a manner known per se.

The invention is illustrated by the following example.

EXAMPLE

How to Apply the Coating

Amorphous silicate and crystalline oxide in powder form is mixed with water. Stabilizer, if used, is added to this wet mixture. One or more emissivity agents may be added.

This wet mixture is continuously stirred, to avoid settling of suspended solids. Preferably a high sheer impeller is used at high rpm (at least 3000 rpm).

With a high speed impellor a mixing time of 30 minutes gives a good result. Alternative mixing methods including hand shaking can be used.

The protective layer can be applied to the metal surface, e.g. by spraying. Good results are obtained with air spraying with oil free air and a 1 mm nozzle and an air pressure between 1 and 2 bar.

A uniform coverage and density of the product is desired. Preferably, when spraying the angle of the spray gun is rotated about 90 degrees during application to prevent stripes.

The dry coating thickness should preferably be between 25 to 500 micrometer. A thicker layer may result in poor performance because it may peel off.

Initially the metal surface is cleaned of all dirt, loose material, dirt etc by e.g. grit blasting. After grit blasting the surface is cleaned by a cleaner (solvent) such as alcohol or methyl ethyl ketone or commercial cleaner or similar. After cleaning the metal may be rinsed by demineralised water and air dried.

The coating is preferably applied as soon as possible after the metal is dry to ensure that the surface remains as clean as possible.

The metal is preferably at room temperature and completely dry before application of the protective coating of the present invention. If the metal is not dry and clean, this may cause cracking or peeling of the coating.

After applying the mixture to the metal surface, the coating is prefer ably air dried. Alternative the coating is heat dried.

After drying a solidification can be done at a temperature of at least 800 deg. C. for a period of time of at least 10 minutes.

This solidification gives a glassy nature of the silicates and increases the strength thanks to formation of Na2O.SiO2. This increases the strength and reduces solubility to water.

After the solidification the coating is ready for use.

The solidification can be done during the first use of the coating. In this case care shall be taken not to damage (scratch) the coating until the coating is heated to over 800 deg. C.

BRIEF DESCRIPTION OF THE DRAWINGS

The invention is further illustrated by corrosion tests of which results are shown in FIGS. 1 to 5.

FIG. 5 shows the EDX analysis of the coating material

DESCRIPTION OF EMBODIMENTS

Figure 1:
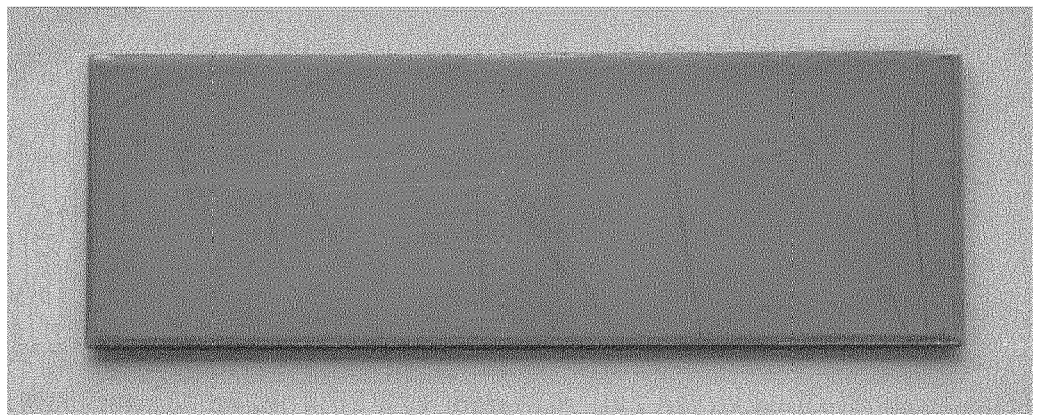
FIG. 1 shows an uncoated test surface for a metal dusting experiment before exposure (Uncoated Stainless steel 19Cr8Ni2Mn67Fe (304H)).

Stainless steel 19Cr8Ni2Mn67Fe (304H) test plates with dimensions of 25 mm×80 mm (FIG. 1) were provided for exposure to a reducing gas. The gas comprised 47 vol % $H_2$, 37 vol % CO, 7 vol % $CO_2$, 9 vol % $H_2O$. The effect of the reducing gas on a uncoated plate was compared with the effect of the reducing gas of a plate that had been coated with a coating composition comprising colloidal amorphous silica and crystalline silica. The thickness of the coating was about 50 µm. FIG. 5 shows the EDX analysis of the coating material. The coating contain:

O: 61 wt %
Na: 2 wt %
Al: 0.5 wt %
Si: 36 wt %

Figure 2:
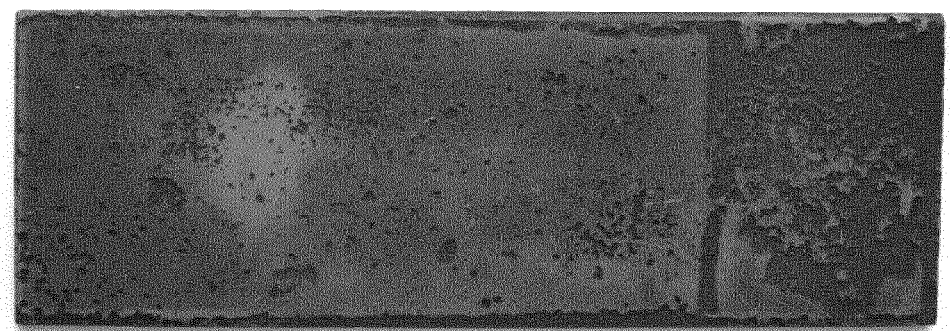
FIG. 2. shows the state of the uncoated test surface of FIG. 1 after 500 hours exposure to a reducing gas.
Figure 3:
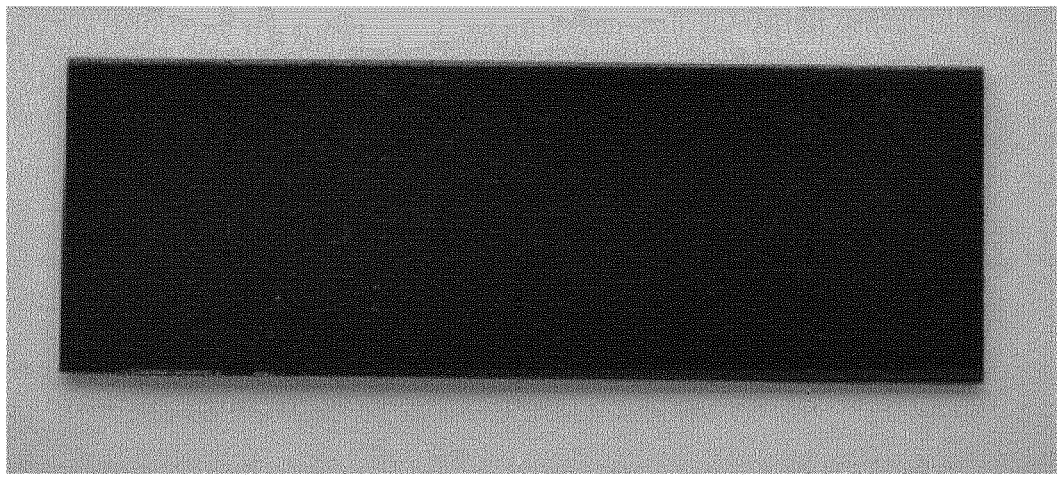
FIG. 3. shows a coated test surface for a metal dusting experiment before exposure.

The plates were exposed to the reducing gas for 500 hours at 600° C. As illustrated by FIG. 2, the surface of the uncoated stainless steel shows pitting as well as uniform surface corrosion. The weight loss of the plate was 1 g.

Figure 4:
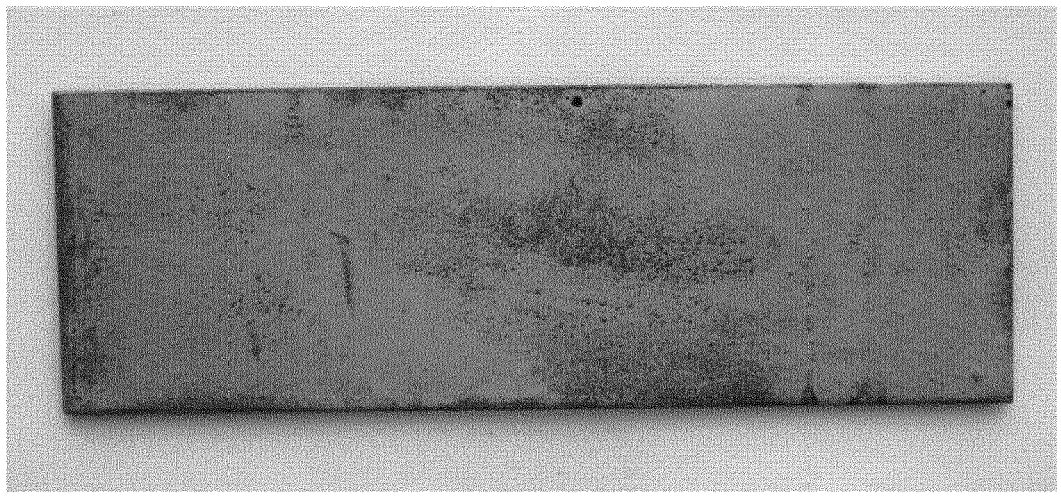
FIG. 4. Shows the state of the coated test surface for a metal dusting experiment after 500 hours exposure.

However, the corrosion of the plate provide with the protective coating was negligible, as illustrated by FIG. 4. The weight of the plate before and after exposure was the same.

What is claimed is:

1. A method for heating or cooling a carbon containing reducing gas having a carbon monoxide content of at least 0.5 vol %, wherein the gas is heated to a temperature of at least 400° C., the method comprising:
   heating the gas by passing the gas along a surface of a heating or cooling unit comprising a heat conductive metal or metal alloy body and a protective layer that reduces corrosion caused by carburization or metal dusting,
   wherein the protective layer provides said surface, and is made from a coating composition comprising:
   colloidal amorphous silicate comprising colloidal silica and amorphous silicate;
   crystalline oxide particles;
   optionally an emissivity agent; and
   optionally a stabiliser/binding agent.

2. A method according to claim 1, wherein the reducing gas has a content of carbon monoxide of at least 1 vol %.

3. A method according to claim 1, wherein the reducing gas has a content of carbon monoxide of at least 2 vol %.

4. A method according to claim 1, wherein the reducing gas comprises hydrogen ($H_2$) and carbon monoxide (CO) as the major components.

5. A method according to claim 4, wherein carbon monoxide and hydrogen in the reducing gas are reacted to form hydrocarbon.

6. A method according to claim 1, wherein the reducing gas comprises 20-80 vol. % $H_2$ and 5-50 vol. % CO.

7. A method according to claim 6, wherein the reducing gas further comprises at least one of 1-15 vol. % $CO_2$, 1-40 vol. % $CH_4$ and 1-75 vol. % $H_2O$.

8. A method according to claim 1, wherein the reducing gas is synthesis gas.

9. A method according to claim 1, wherein the heating or cooling method is used in a process selected from the group consisting of coal liquefaction, coal gasification, synthesis gas production, and processing a synthesis gas.

10. A method according to claim 1, wherein the heating or cooling unit is a tubular heating or cooling unit, the gas is passed through the tube and the protective layer is provided on the inner surface of the tube.

11. A method for heating a gas according to claim 1, wherein the gas is heated to a temperature of 400-900° C.

12. A method according to claim 1, wherein the gas comprises a carbon compound selected from the group consisting of carbon monoxide, alkanes, and carbon dioxide.

13. A method according to claim 1, wherein the gas is essentially free of molecular oxygen.

14. A method according to claim 1, wherein the metal or metal containing alloy is a nickel alloy.

15. A method according to claim 1, wherein the colloidal amorphous silicate comprises at least one of an amorphous colloidal alkali metal silicate and an alkaline earth metal silicate.

16. A method according to claim 1, wherein the coating composition comprises, based on dry weight of the composition:
   5-35 wt. % colloidal amorphous silicate;
   23-79 wt. % crystalline oxide particles;
   0-20 wt. % emissivity agent;
   0-5 wt. % stabiliser/binding agent.

17. Method according to claim 1, wherein the colloidal amorphous silicate is selected from the group comprising sodium silicate, potassium silicate, calcium silicate and magnesium silicate.

18. A method according to claim 1, wherein the crystalline oxide particles are selected from the group consisting of silicon dioxide, aluminium oxide, titanium dioxide, magnesium oxide, calcium oxide, boron oxide, lithium oxide and zirconium oxide.

19. A method according to claim 1, wherein the coating comprises colloidal amorphous sodium silicate particles, colloidal silica and crystalline aluminium oxide.

20. A method according to claim 1, wherein an emissivity agent is present selected from the group consisting of the silicon hexaboride, boron carbide, silicon tetraboride, silicon carbide, molybdenum disilicide, tungsten disilicide, zirconium diboride, cupric chromite and metallic oxides.

21. A method according to claim 1, wherein a stabiliser agent is present and selected from the group consisting of bentonite, kaolin, magnesium alumina silica clay, tabular alumina and stabilized zirconium oxide.

22. A method according to claim 1, wherein the protective layer is non-porous.

23. A method according to claim 1, wherein the protective layer is glassy.

24. A method according to claim 1, wherein the heating or cooling method is used in a steam reforming synthesis gas production process.

25. A method according to claim 1, wherein the heating or cooling method is used in a synthesis gas process selected from the group consisting of an ammonia production process, a direct reduction process, and a Fischer-Tropsch process.

26. The method according to claim 1, wherein the protective layer comprises an amorphous silicate in amount of 5-35 wt. % and crystalline oxide in an amount of 23-79 wt. %, based on total dry weight of the coating.

27. A method according to claim 1, wherein the gas further comprises hydrogen gas.

28. A method according to claim 1, further comprising: cooling the gas from a temperature exceeding 400° C. in a unit comprising the protective layer.

* * * * *